United States Patent [19]
Eickman

[11] 3,796,822
[45] Mar. 12, 1974

[54] ELECTRICAL SERVICE MOUNTING

[76] Inventor: Willis Victor Eickman, 9570 Washington Church Rd., Miamisburg, Ohio 45342

[22] Filed: Feb. 9, 1973

[21] Appl. No.: 330,988

[52] U.S. Cl............................ 174/48, 52/27, 52/508
[51] Int. Cl................................................. H02g 3/02
[58] Field of Search............................ 174/48, 49; 317/104–111; 248/205 R; 52/220, 221, 27, 506, 508, 511, 512, 603

[56] References Cited
UNITED STATES PATENTS

| 3,025,432 | 3/1962 | Giegerich | 174/48 X |
| 3,247,337 | 4/1966 | Wiegel | 317/108 X |
| 2,723,822 | 11/1955 | McGuire | 52/221 X |
| 2,078,069 | 4/1937 | Eliel | 52/508 X |
| 3,327,446 | 6/1967 | Tracy | 52/511 |
| 1,399,023 | 12/1921 | Murray | 52/511 |

*Primary Examiner*—Bernard A. Gilheany
*Assistant Examiner*—David A. Tone
*Attorney, Agent, or Firm*—Biebel, French & Bugg

[57] ABSTRACT

A mounting pedestal for electrical service to a building is provided in the form of a rigid block having provisions on one side for supporting electrical service connections and a meter on the exterior of the building, and on the other side of the block one or more mounting brackets which space the block from the exterior load bearing walls of the building so as to be flush with veneer later applied to the exterior of the building.

3 Claims, 6 Drawing Figures

PATENTED MAR 12 1974 3,796,822
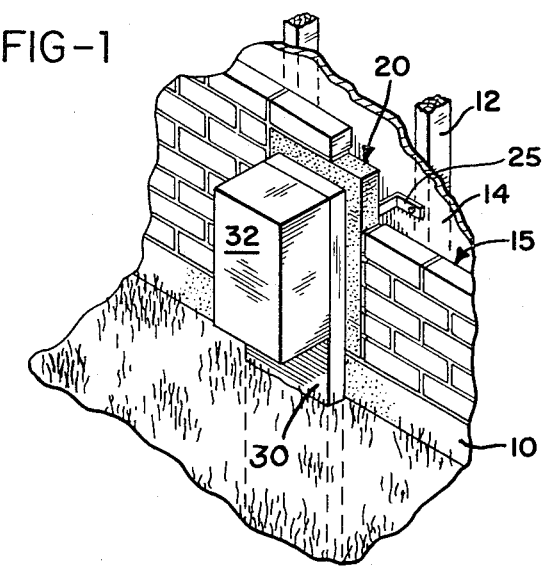
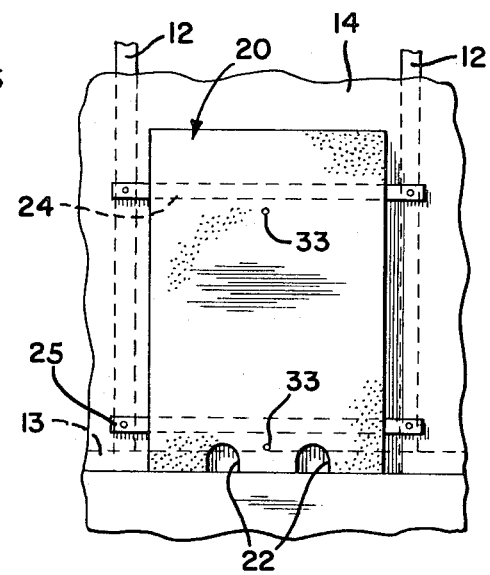
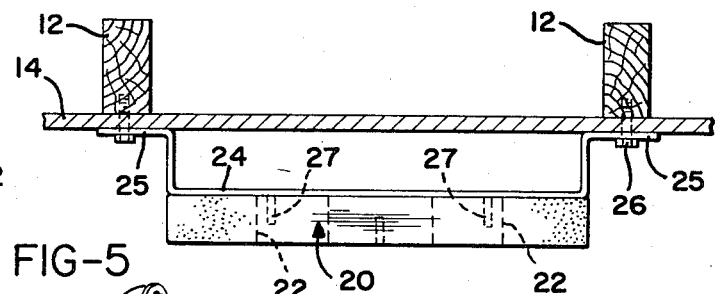
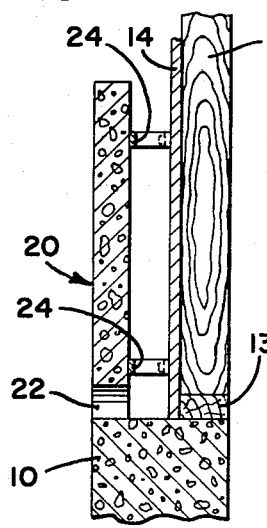
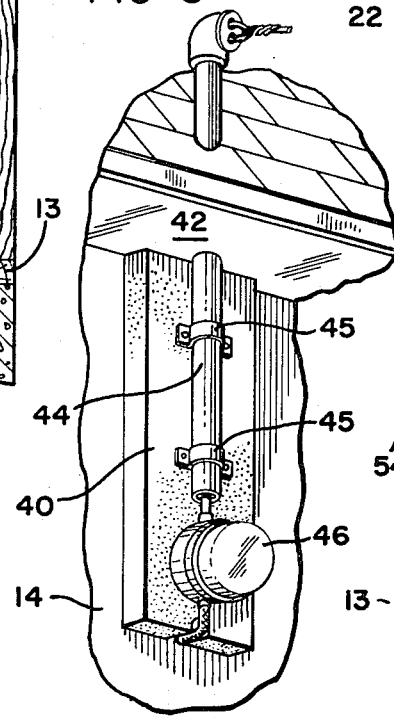
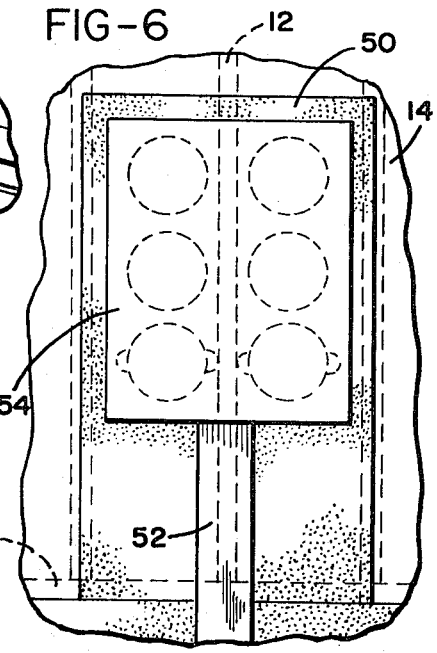

3,796,822

ELECTRICAL SERVICE MOUNTING

BACKGROUND OF THE INVENTION

This invention relates to a simplified mounting arrangement for early and permanent installation of electrical service connections, and in usual cases also an electrical meter, on the exterior of a building. In the course of building construction, particularly single and small multiple dwellings, once the building is under roof, the windows and doors are installed, and insulation board or equivalent is applied to the load bearing walls, the contractor prefers to install electrical service to permit further interior work to be continued even though the exterior veneer such as brick or shingle siding or the like may not as yet be applied.

Due to the well known shortage in supply of gas and oil for heating purposes, and for other reasons, there is also an increasing use of electrical heat for such dwellings. The electrical service for such an installation obviously has heavier duty requirements than for merely lighting, appliances, and cooking. It is quite common to have 200 to 400 ampere service where electrical heating is installed. The electrical power companies will not provide a temporary service at this rating, but generally insist upon a permanent installation before the service is connected to their lines. Heretofore it had been common for the power company to provide a temporarily lower power service which could be used for lighting or the like in a dwelling until the permanent service connections and meter were secured to the building exterior, but such a temporary supply does not have the capacity to handle the aforementioned heating requirements.

On the other hand, especially in colder climates, the contractor is faced with shortages of veneer materials such as brick or shingles, difficulties in getting these materials to the building site due to inclement weather, and even the inability to apply the exterior veneer material until there is suitable weather conditions. As a result, contractors have encountered serious delays, with resulting loss of time and money.

SUMMARY OF THE INVENTION

The present invention overcomes the difficulties encountered, as set forth above, by providing a mounting pedestal, preferably of finished concrete, which can be set in place spaced from the exterior load bearing wall structure of the dwelling, such that the veneer material can later be applied up to and flush with the mounting pedestal. The pedestal includes provisions for supporting the higher rated electrical service connections and one or more electrical watt-hour meters. Full duty electrical service can thus be installed permanently to the dwelling at a suitable time, long before the exterior veneer is applied, and the contractor is able to heat the house and proceed with interior construction.

The primary object of the invention, therefore, is to provide a novel mounting arrangement for electrical service to buildings such as single and multiple family dwellings, wherein a mounting block is provided with means for supporting at spaced locations from the load bearing walls of the building, to be flush with the exterior veneer of the building once it is applied, and to provide a permanent mounting for the electrical service before the veneer is applied to the building.

Other objects and advantages of the invention will be apparent from the following description, the accompanying drawing and the appended claims.

BRIEF DESCRIPTION OF THE DRAWING

FIG. 1 is a perspective view, with parts broken away and shown in cross-section, illustrating the mounting pedestal, one of its mounting support brackets, part of an exterior load bearing wall, a portion of brick veneer applied up to the pedestal, and a typical underground electrical supply conduit with attached meter box fastened to the exterior of the pedestal;

FIG. 2 is a front plan view of the pedestal showing its support brackets and a segment of the building foundation and load bearing wall;

FIG. 3 is a top view of the pedestal showing the bracket and a portion of the load bearing wall;

FIG. 4 is a vertical cross-sectional view of the pedestal;

FIG. 5 is a perspective view illustrating a pedestal used for electrical service from an overhead supply; and FIG. 6 is a view similar to FIG. 2 showing a larger pedestal used to mount a plurality of meters, as in a typical multi-family dwelling.

DESCRIPTION OF THE PREFERRED EMBODIMENT

Referring to FIG. 1, a wall section of a typical dwelling is shown including a foundation 10 and a part of a load bearing wall including studs 12, a bottom plate 13 (FIG. 4) insulation board 14 and a partially applied exterior brick veneer 15. The pedestal or mounting block provided by the invention is a rectangular block of rigid material, such as cast concrete, illustrated generally at 20. At its lower end the block has a pair of half circular ports 22 which provide passage between the foundation upper surface and the block, into the interior of the building, for the power supply cables.

Attached to the rear of block 20 are mounting means which preferably are in the form of U-shaped steel brackets 24 having outwardly extending attachment ears or ends 25 adapted to be attached by suitable bolts 26 to the studs 12 of the wall. The normal spacing of the bolt holes in the ears, therefore, is approximately sixteen inches, corresponding to the conventional center-to-center spacing of building studs. The brackets are secured to the block 20 by one or more anchors 27. The pedestal in the configurations shown in FIGS. 1–4 and 6 rests upon the upper edge of the foundation 10, particularly as shown in FIG. 4, with the outer face of the block 20 generally flush with the edge of the foundation. The spacing of the outer face of the block from the exterior load bearing wall will depend upon the type of veneer used in the construction.

In the illustrated embodiment brick veneer is employed and several rows of brick are shown in FIG. 1 laid flush with the block 20, with a typical air space between the brick and the insulation board 14. As shown in FIG. 1, a typical duct, usually constructed of sheet metal, extends from an underground trench, carrying the power supply cable up along the exterior of the block 20. Attached to the duct is a protective meter box 32 which may contain a suitable window (not shown) or another provision to enable a meter mounted within the box to be read from outside the building. The power supply cable extends through the conduit 30 to such a meter, and from the meter through one of the ports 22 to the interior fuse or circuit breaker box and the power distribution system for the dwelling. One or more anchor holes 33 may be provided in the front face of block 20 to facilitate attachment to the conduit and meter box.

FIG. 5 illustrates another embodiment of the invention wherein a somewhat longer block 40 is mounted spaced from a load bearing wall of a building at the same manner as shown in FIGS. 1–4, extending from beneath an overhanging eave 42 down the wall approximately at eye level height. The overhead power supply extends from the power company lines to a mast 44 which can extend to the part of the eave and along the block 40 to which the mast may be attached to one or more brackets 45. A typical meter 46 is mounted on the lower end of block 40, and the power supply cable extends through the mast to the meter, and through the meter into the dwelling of the building. A suitable veneer (not shown) can be applied flush with the outer surface of the block 40. If desired a cover box can be added over the meter, although a box is not customarily used in this type of service.

FIG. 6 illustrates another form of the invention, similar to that shown in FIGS. 1–4, wherein the block 50 is considerably wider, and is supported by brackets corresponding to the brackets 24 which cover the span between three successive wall studs. The block is sufficiently large to accommodate, for example, six separate meters and the corresponding power cable necessary to bring the supply to each meter, and separately from each meter to the distribution systems in a number of different apartments, as in a multi-family dwelling. In other respects the embodiment shown in FIG. 6 is essentially identical to that shown in FIGS. 1–4, together with the underground service duct 52 and a larger cover box 54 which may have a number of appropriate viewing windows which are not shown.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A mounting for electrical service to a building having a foundation and load bearing walls thereon to which a finish veneer is to be applied above the edge of the foundation, said mounting comprising a rigid block including means on one side thereof for supporting electrical service connections on the exterior of the building, mounting means on the other side of said block including spaced parts adapted for connection to said walls and dimensioned to locate said one side of said block for flush relationship with the exterior of the finish veneer.

2. Apparatus as defined in claim 1, wherein said mounting means includes at least one bracket fastened to the other side of said block and having portions extending away from said block and terminating in said spaced parts extending parallel to said other side of said block.

3. A pedestal mounting for electrical service to a building having load bearing external walls thereon over which a finish veneer is to be applied, said mounting comprising a rigid block including means on one side thereof for supporting electrical service connections on the exterior of the building, mounting means on the other side of said block including a pair of spaced apart brackets fastened to the other side of said block, each bracket having portions extending away from said block and terminating in ears extending parallel to said other side of said block, said ears being arranged to receive mounting retainers and being spaced to align with conventionally spaced studs in a building wall.

* * * * *